United States Patent
Mizutani et al.

(10) Patent No.: US 9,803,084 B2
(45) Date of Patent: Oct. 31, 2017

(54) RESIN COMPOSITION FOR FUEL TUBES, AND FUEL TUBE

(71) Applicant: Sumitomo Riko Company Limited, Komaki-shi, Aichi (JP)

(72) Inventors: Koji Mizutani, Komaki (JP); Kazutaka Katayama, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 552 days.

(21) Appl. No.: 14/528,481

(22) Filed: Oct. 30, 2014

(65) Prior Publication Data

US 2015/0056393 A1 Feb. 26, 2015

Related U.S. Application Data

(63) Continuation of application No. PCT/JP2013/069931, filed on Jul. 23, 2013.

(30) Foreign Application Priority Data

Sep. 25, 2012 (JP) ................................. 2012-211262

(51) Int. Cl.
  *C08L 77/02* (2006.01)
  *C08L 77/06* (2006.01)
  *F16L 11/04* (2006.01)
  *F16L 9/127* (2006.01)

(52) U.S. Cl.
  CPC .............. *C08L 77/02* (2013.01); *C08L 77/06* (2013.01); *F16L 9/127* (2013.01); *F16L 11/04* (2013.01); *C08L 2205/02* (2013.01); *Y10T 428/139* (2015.01)

(58) Field of Classification Search
  CPC .......... C08L 77/02; C08L 77/06; C08L 33/14; C08L 2205/02; F16L 11/04; F16L 9/127; Y10T 428/139; B32B 27/18
  See application file for complete search history.

(56) References Cited

U.S. PATENT DOCUMENTS

| 6,576,342 B1 | 6/2003 | Cerf et al. |
| 2009/0143524 A1 | 6/2009 | Nakayama et al. |
| 2012/0012222 A1* | 1/2012 | Mizutani ................. F16L 11/04 138/137 |

FOREIGN PATENT DOCUMENTS

| JP | 01-318050 A | 12/1989 |
| JP | 08-048874 A | 2/1996 |
| JP | 08-506780 A | 7/1996 |
| JP | 2004-301247 A | 10/2004 |
| JP | 2004-352790 A | 12/2004 |
| JP | 2004352790 | * 12/2004 |
| JP | 2011-202069 A | 10/2011 |
| JP | 2013-064423 A | 4/2013 |
| WO | 2007037260 A1 | 4/2007 |

OTHER PUBLICATIONS

Notification of Transmittal of Translation of the International Preliminary Report on Patentability (Chapter I or Chapter II) (form PCT/IB/338) mailed Apr. 9, 2015, with forms PCT/IB/373 and PCT/ISA/237. (6 pages).
International Search Report dated Oct. 15, 2013, issued in corresponding application No. PCT/JP2013/069931.

* cited by examiner

*Primary Examiner* — Yan Lan
(74) *Attorney, Agent, or Firm* — Westerman, Hattori, Daniels & Adrian, LLP

(57) ABSTRACT

A resin composition for fuel tubes includes an aromatic polyamide resin (A), an aliphatic polyamide resin (B), and an aminoethylated acrylic polymer (C), wherein a polyamide resin obtained by an amine-exchange reaction between (A) and (B) is contained, and at least one selected from the group consisting of the polyamide resin, (A), and (B) is bound to (C). The resin composition for fuel tubes can achieve both resistance to calcium chloride and fuel barrier properties at the same time and has excellent molding processability.

6 Claims, No Drawings

RESIN COMPOSITION FOR FUEL TUBES, AND FUEL TUBE

RELATED APPLICATION

This application is a continuation of International Application No. PCT/JP2013/69931, filed on Jul. 23, 2013, which claims priority to Japanese Patent Application No. 2012-211262, filed on Sep. 25, 2012, the entire contents of each of which are hereby incorporated by reference.

BACKGOUND OF THE INVENTION

Field of the Invention

The present invention relates to a resin composition for fuel tubes and a fuel tube including the same.

Description of the Related Art

Rubber hoses or resin hoses are conventionally used as fuel tubes for cars and the like. Such resin hoses are produced using a resin composition containing a polyamide resin and the like (see, for example, JP-A-2004-352790).

As the polyamide resin, polyamide 6 (PA6), polyamide 11 (PA11), polyamide 12 (PA12), polyamide 1010 (PA1010), polyamide 610 (PA610), polyamide 612 (PA612), or the like is used. However, PA6 has a high amide group concentration and is poor in resistance to calcium chloride (resistance to a snow-melting agent), and therefore it is difficult to use PA6 as the material of the outer layer of a fuel tube. For this reason, PA11, PA12, PA1010, PA610, PA612, and the like are used instead of PA6, but have room for improvement in fuel barrier properties (low fuel permeability) and molding processability.

SUMMARY OF THE INVENTION

Under the circumstances, it is an object of the present invention to provide a resin composition for fuel tubes that can achieve both resistance to calcium chloride and fuel barrier properties at the same time and has excellent molding processability, and a fuel tube including the same.

In order to obtain a fuel tube that can achieve both resistance to calcium chloride and fuel barrier properties at the same time and has excellent molding processability, the present inventors have intensively studied materials for forming such a fuel tube. In the course of such studies, the present inventors have found that the use of a polyamide resin obtained by an amine-exchange reaction between an aromatic polyamide resin such as polyamide 9T (PA9T) and an aliphatic polyamide resin such as PA6 makes it possible to achieve both resistance to calcium chloride and fuel barrier properties at the same time. However, the present inventors have also found that the use of this polyamide resin obtained by an amine-exchange reaction causes an increase in molding temperature during molding, which reduces the viscosity of the polyamide resin and impairs molding processability. Therefore, the present inventors have further studied, and as a result have found that the viscosity of the polyamide resin can be increased by binding (reacting) at least one selected from the group consisting of the polyamide resin obtained by an amine-exchange reaction, the aromatic polyamide resin, and the aliphatic polyamide resin to (with) an aminoethylated acrylic polymer as a thickener so that molding processability is improved while the molding temperature is maintained. This finding has led to the completion of the present invention.

More specifically, a first aspect of the present invention is directed to a resin composition for fuel tubes including the following (A) to (C):

(A) an aromatic polyamide resin;
(B) an aliphatic polyamide resin; and
(C) an aminoethylated acrylic polymer, wherein the resin composition contains a polyamide resin (D) obtained by an amine-exchange reaction between (A) and (B), and at least one selected from the group consisting of the polyamide resin (D), (A), and (B) is bound to (C).

A second aspect of the present invention is directed to a fuel tube including at least one resin layer, wherein the resin layer is composed of the resin composition for fuel tubes according to the first aspect of the present invention.

As described above, the resin composition for fuel tubes according to the present invention contains a polyamide resin obtained by binding (reacting) at least one selected from the group consisting of a polyamide resin obtained by an amine-exchange reaction between an aromatic polyamide resin such as PA9T and an aliphatic polyamide resin such as PA6, the aromatic polyamide resin, and the aliphatic polyamide resin to (with) an aminoethylated acrylic polymer as a thickener. This makes it possible to increase the melt viscosity of the polyamide resin and therefore to achieve excellent molding processability. In addition, it is also possible to achieve both resistance to calcium chloride and fuel barrier properties at the same time.

Particularly, when the aromatic polyamide resin (A) is PA9T and the aliphatic polyamide resin (B) is PA6, the polyamide resin obtained by an amine-exchange reaction has a PA6/9T structure, which makes it possible to achieve an excellent balance of resistance to calcium chloride, fuel barrier properties, and molding processability.

Further, when the polyamide resin (D) obtained by an amine-exchange reaction between (A) and (B) and bound to the aminoethylated acrylic polymer (C) has a melt viscosity in the range of 200 to 4,000 Pa·s, molding processability is improved.

Further, when the amount of (C) contained in the resin composition for fuel tubes is in the range of 0.1 to 5 parts by weight per 100 parts by weight of the total amount of (A) and (B), excellent molding processability is achieved.

Further, when the resin composition for fuel tubes contains an impact resistant agent, low-temperature impact resistance is improved.

DETAILED DESCRIPTION OF THE INVENTION

Hereinbelow, embodiments of the present invention will be described in detail. However, the present invention is not limited to these embodiments.

A resin composition for fuel tubes according to the present invention (hereinafter, sometimes simply referred to as "resin composition") includes the following (A) to (C): (A) an aromatic polyamide resin; (B) an aliphatic polyamide resin; and (C) an aminoethylated acrylic polymer, wherein a polyamide resin obtained by an amine-exchange reaction between (A) and (B) is contained, and at least one selected from the group consisting of the polyamide resin, (A), and (B) is bound to (C).

<Aromatic Polyamide Resin (A)>

The aromatic polyamide resin (A) is preferably a semi-aromatic polyamide resin. Examples of such a semi-aromatic polyamide resin include polyamide 4T (PA4T), polyamide 6T (PA6T), polyamide MXD6 (PAMXD6), polyamide 9T (PA9T), polyamide 10T (PA10T), polyamide 11T (PA11T), polyamide 12T (PA12T), and polyamide 13T (PA13T). They may be used singly or in combination of two or more of them. Among them, PA9T is preferred in terms of resistance to calcium chloride and fuel barrier properties.

<Aliphatic Polyamide Resin (B)>

Examples of the aliphatic polyamide resin (B) include polyamide 6 (PA6), polyamide 11 (PA11), polyamide 12 (PA12), polyamide 46 (PA46), polyamide 66 (PA66), polyamide 92 (PA92), polyamide 99 (PA99), polyamide 610 (PA610), polyamide 612 (PA612), polyamide 912 (PA912), polyamide 1010 (PA1010), polyamide 1012 (PA1012), copolymers of polyamide 6 and polyamide 12 (PA6/12), and copolymers of polyamide 6 and polyamide 66 (PA6/66). They may be used singly or in combination of two or more of them. Among them, PA6 is preferred in terms of molding processability and cost.

The mixing ratio by weight between the aromatic polyamide resin (A) and the aliphatic polyamide resin (B) is preferably in the range that (A)/(B) is from 95/5 to 50/50, particularly preferably in the range that (A)/(B) is from 90/10 to 60/40. If the amount of (A) is too large, molding processability tends to be poor, and if the amount of (A) is too small, resistance to calcium chloride and fuel barrier properties tend to be poor.

<Aminoethylated Acrylic Polymer (C)>

Examples of the aminoethylated acrylic polymer (C) include a primary amino group-containing acrylic polymer having grafted polyethyleneimine in its side chain (hereinafter, sometimes simply referred to as "primary amino group-containing acrylic polymer"). Such a primary amino group-containing acrylic polymer can be obtained by, for example, reaction between ethyleneimine and a carboxyl group.

The primary amino group-containing acrylic polymer can be classified into the following three types (1) to (3) according to its structure: (1) a fully water-based emulsion-type resin; (2) a water-reducible resin produced by neutralization of amino group moieties; and (3) a solvent-based resin synthesized in a solvent.

The viscosity (mPa·s/25° C.) of the aminoethylated acrylic polymer (C) is preferably 40,000 or less, particularly preferably 2,000 or less.

The amine hydrogen equivalent weight (solid weight (g) equivalent to 1 mol of amine) of the aminoethylated acrylic polymer (C) is preferably in the range of 350 to 1,800 (g-solid/eq), particularly preferably in the range of 800 to 1,400 (g-solid/eq).

The amine value (the number of mmoles of amine contained in 1 g of solid) of the aminoethylated acrylic polymer (C) is preferably in the range of 0.6 to 2.9 (mmol/g-solid), particularly preferably in the range of 0.7 to 1.3 (mmol/g-solid).

The weight-average molecular weight (MW) of the aminoethylated acrylic polymer (C) is preferably in the range of 10,000 to 100,000, particularly preferably in the range of 80,000 to 100,000.

Specific examples of the aminoethylated acrylic polymer (C) include POLYMENT NK-380 manufactured by NIPPON SHOKUBAI CO., LTD. (viscosity: 2,000 (mPa·s/25° C.) or less, amine hydrogen equivalent weight: from 800 to 1400 (g-solid/eq), amine value: from 0.7 to 1.3 (mmol/g-solid), MW: 100,000).

The content of the aminoethylated acrylic polymer (C) in the resin composition is preferably in the range of 0.1 to 5 parts by weight, particularly preferably in the range of 0.4 to 0.6 part by weight per 100 parts by weight of the total amount of (A) and (B). If the content of (C) in the resin composition is too small, the melt viscosity of the resulting polyamide resin is too low so that molding processability tends to be poor. If the content of (C) in the resin composition is too large, the melt viscosity of the resulting polyamide resin is too high so that molding processability tends to be poor.

The melt viscosity of the polyamide resin obtained by an amine exchange reaction between (A) and (B) and bound to (C) is preferably in the range of 200 to 4,000 Pa·s, particularly preferably in the range of 1,000 to 2,000 Pa·s. If the melt viscosity of the polyamide resin is too low or too high, molding processability tends to be poor.

It is to be noted that, if appropriate, the resin composition according to the present invention may appropriately contain, in addition to the above (A) to (C), an impact resistant agent, a plasticizer, a filler, a hydrolysis inhibitor, a heat-resistant anti-aging agent, an ultraviolet inhibitor, an antioxidant, a flexible component, a nucleating agent, a lubricant, or the like.

The impact resistant agent is used from the viewpoint of improving flexibility or impact resistance. Examples of the impact resistant agent include ionomer resins, modified polyolefins (maleic anhydride-modified ethylene-butene copolymers and the like), polyetheramide elastomers, polyesteramide elastomers, polyetheresteramide elastomers, polyetherester elastomers, acrylic rubbers, ethylene-propylene-based rubbers, butyl rubbers, nitrile rubbers, fluorine-containing rubbers, and silicone rubbers. They may be used singly or in combination of two or more of them.

The amount of the impact resistant agent contained in the resin composition is preferably in the range of 0.1 to 20 parts by weight, particularly preferably in the range of 5 to 10 parts by weight per 100 parts by weight of the total amount of (A) and (B).

The plasticizer is preferably, for example, one or more compounds selected from alkylamides. Examples of the plasticizer include N-ethyl-o-toluenesulfonic acid butylamide, N-ethyl-p-toluenesulfonic acid butylamide, N-ethyl-p-toluenesulfonic acid 2-ethylhexylamide, N-propyl-p-toluenesulfonic acid amide, p-toluenesulfonic acid 1-ethylhexyl, and N-butylbenzenesulfonamide. They may be used singly or in combination of two or more of them.

The content of the plasticizer in the resin composition is preferably in the range of 0.1 to 10 parts by weight, particularly preferably in the range of 3 to 5 parts by weight per 100 parts by weight of the total amount of (A) and (B).

The resin composition according to the present invention can be prepared, for example, in the following manner. That is, the resin composition according to the present invention may be prepared by appropriately mixing the aromatic polyamide resin (A), the aliphatic polyamide resin (B), the aminoethylated acrylic polymer (C), and, if appropriate, other components such as an impact resistant agent and kneading the mixture with a twin-screw kneader, or the resin composition according to the present invention may be directly prepared by kneading them with a single-screw kneader upon melt molding. The resin composition according to the present invention contains a polyamide resin obtained by an amine-exchange reaction between (A) and (B) and bound to (C). When the above-described primary amino group-containing acrylic polymer having grafted polyethyleneimine in its side chain is used as the aminoethylated acrylic polymer (C), a polyamide resin obtained by an amino-exchange reaction between (A) and (B) and bound to (reacted with) the primary amino groups of (C) is obtained.

Hereinbelow, a fuel tube according to the present invention will be described.

The fuel tube according to the present invention includes at least one resin layer, wherein the resin layer is composed of the resin composition for fuel tubes according to the present invention.

A method for producing the fuel tube according to the present invention will be described. That is, a resin composition is prepared according to the above-described method and then extruded into a tube so that a fuel tube having a single layer structure formed from a tubular resin layer is produced.

The temperature of extrusion molding (molding temperature) is preferably from 320 to 340° C., particularly preferably from 325 to 335° C. If the molding temperature is too low, extrusion molding tends to be impossible due to an increase in viscosity. If the molding temperature is too high, extrusion molding tends to be impossible due to decomposition.

The extrusion rate is typically from 1 to 30 m/min, preferably from 5 to 20 m/min. The screw rotation speed is typically from 10 to 600 rpm, preferably from 20 to 150 rpm, and the discharge rate is typically from 2 g/min to 100 kg/min, preferably from 20 g/min to 3 kg/min.

The fuel tube according to the present invention is not limited to one having a single layer structure formed from only the above-described special resin layer. The fuel tube according to the present invention may have a multi-layer structure including two or more layers depending on its intended use. For example, a rubber layer or another resin layer may be provided on the inner or outer peripheral side of the resin layer, or a reinforcing layer made of a reinforcing yarn or the like may be interposed between layers constituting the fuel tube.

The inner and outer diameters of the fuel tube according to the present invention vary depending on the intended use of the fuel tube, but the fuel tube according to the present invention typically has an inner diameter of from 1 to 69.5 mm and an outer diameter of from 1.5 to 70 mm. The thickness of the resin layer is typically from 0.25 to 20 mm, preferably from 0.5 to 5 mm.

EXAMPLES

Hereinbelow, the present invention will be described more specifically with reference to examples. However, the present invention is not limited to the following examples unless departing from the spirit thereof.

Prior to the description of examples and comparative examples, the following materials were first prepared as materials of resin compositions.

<Aromatic Polyamide Resin (A)>
Polyamide 9T (PA9T) (manufactured by KURARAY CO., LTD., Genestar N1001D)

<Aliphatic Polyamide Resin (B)>
Polyamide 6 (PA6) (manufactured by TORAY INDUSTRIES INC., AMILAN CM1017)

<Aminoethylated Acrylic Polymer (C)>
POLYMENT NK-380 manufactured by NIPPON SHOKUBAI CO., LTD. (viscosity: 2,000 (mPa·s/25° C.) or less, amine hydrogen equivalent weight: 800 to 1400 (g-solid/eq), amine value: 0.7 to 1.3 (mmol/g-solid), MW: 100,000)

<Epoxy-Modified Acrylic Polymer (C')>
ARUFON UG4040 manufactured by TOAGOSEI CO., LTD.

<Impact Resistant Agent>
Maleic anhydride-modified ethylene-butene copolymer (manufactured by Mitsui Chemicals, Inc., TAFMER MH7020)

Example 1

The components shown in the following Table 1 were mixed in the ratio shown in the same table and kneaded with a twin-screw kneader (manufactured by The Japan Steel Works, Ltd., TEX30α) to prepare a resin composition. Then, the resin composition was extruded by an extrusion molding machine (manufactured by Research Laboratory of Plastics Technology Co., Ltd., GT-25) into a tube to produce a fuel tube having a single layer structure (inner diameter: 6 mm, outer diameter: 8 mm).

It is to be noted that the extrusion molding was performed under conditions of an extrusion temperature of 330° C., an extrusion rate of 5 m/min, a screw rotation speed of 40 rpm, and a discharge rate of 100 g/min.

<Examples 2 to 5, Comparative Examples 1 to 4

A fuel tube (inner diameter: 6 mm, outer diameter: 8 mm) was produced in the same manner as in Example 1 except that the amounts of the components to be mixed together were changed as shown in the following Table 1.

TABLE 1

| | | | | | | | | | (parts by weight) |
| --- | --- | --- | --- | --- | --- | --- | --- | --- | --- |
| | Example | | | | | Comparative Example | | | |
| | 1 | 2 | 3 | 4 | 5 | 1 | 2 | 3 | 4 |
| Aromatic polyamide resin (A): PA9T | 95 | 95 | 50 | 50 | 95 | 95 | 95 | 100 | — |
| Aliphatic polyamide resin (B): PA6 | 5 | 5 | 50 | 50 | 5 | 5 | 5 | — | 100 |
| Aminoethylated acrylic polymer (C) | 0.1 | 5 | 0.1 | 5 | 5 | — | — | 5 | 5 |
| Epoxy-modified acrylic polymer (C') | — | — | — | — | — | — | 0.05 | — | — |
| Impact resistant agent | — | — | — | — | 10 | — | — | — | — |
| Resistance to calcium chloride | ○ | ○ | ○ | ○ | ○ | *1 | *2 | *2 | X |
| Fuel barrier properties (mg/m/day) | 14.1 ○ | 19.5 ○ | 20.5 ○ | 27.5 ○ | 25.5 ○ | *1 | *2 | *2 | 45.0 X |
| Molding | 600 | 3500 | 300 | 2100 | 3400 | 190 | 6200 | 4200 | 800 |

TABLE 1-continued

| | Example | | | | | Comparative Example (parts by weight) | | | |
|---|---|---|---|---|---|---|---|---|---|
| | 1 | 2 | 3 | 4 | 5 | 1 | 2 | 3 | 4 |
| processability (Pa · s) | ○ | ○ | ○ | ○ | ○ | X | X | X | ○ |

*1: Tube molding was impossible due to low viscosity.
*2: Tube molding was impossible due to high viscosity.

The thus obtained examples and comparative examples were evaluated for their various properties according to the following criteria. The results are also shown in the above Table 1.

<Resistance to Calcium Chloride>

Each of the fuel tubes was evaluated for its resistance to calcium chloride in the following manner. The following (1) to (3) were regarded as one cycle and repeatedly performed. When a crack was observed in the surface of the fuel tube before 100 cycles, the resistance to calcium chloride was evaluated as X. On the other hand, when no crack was observed in the surface of the fuel tube even after 100 cycles, the resistance to calcium chloride was evaluated as ○.

(1) The fuel tube was allowed to absorb water to saturation in a water tank at 80° C.

(2) The fuel tube was fixed to a jig and bent at R=30, and a 50% $CaCl_2$ solution was applied onto the entire surface of the fuel tube and dried at 100° C. for 5 hours.

(3) The fuel tube after drying was washed with water and its surface condition was observed.

<Fuel Barrier Properties>

A mixed fuel liquid of Fuel C (toluene:isooctane=50:50 (by volume)) and ethanol (FC/E10) (Fuel C:ethanol=90:10 (by volume)) was enclosed in the fuel tube sealed at both ends with hose caps (manufactured by Swagelok Company) and was allowed to stand at 40° C. for 1 month for stabilization. Then, the content (mixed fuel) was discharged. Then, a fresh mixed fuel liquid (FC/E10) was again enclosed in the fuel tube, the fuel tube was allowed to stand in a predetermined temperature cycle environment, and the amount of fuel permeation was measured after a lapse of 24 hours. This operation was repeated three times, and the maximum value among the three measurement values was regarded as the amount of fuel permeation per test. When the amount of fuel permeation was 30 (mg/m/day) or less, the fuel barrier properties were evaluated as ○, and when the amount of fuel permeation exceeded 30 (mg/m/day), the fuel barrier properties were evaluated as X.

<Molding Processability (Melt Viscosity)>

In each of examples and comparative examples, the melt viscosity of the polyamide resin obtained by an amine-exchange reaction between (A) and (B) and bound to (C) was measured at 280° C. and 150 $s^{-1}$. It is to be noted that in some of comparative examples, the amine-exchange reaction did not occur or the polyamide resin was not bound to (C), but the melt viscosity of the polyamide resin was measured in the same manner as in Example 1. When the melt viscosity was in the range of 200 to 4,000 Pa·s, the molding processability was evaluated as ○, and when the melt viscosity was less than 200 Pa·s or exceeded 4,000 Pa·s, the molding processability was evaluated as X.

As can be seen from the results shown in the above Table 1, all the examples were excellent in resistance to calcium chloride, fuel barrier properties, and molding processability. Among them, Example 5 was particularly excellent in low-temperature impact resistance due to the impact resistant agent contained therein.

It is to be noted that all the polyamide resins obtained in examples were subjected to mass spectrometry (MS analysis), and as a result, it was confirmed that at least one of the polyamide resin obtained by an amine-exchange reaction between PA9T and PA6, PA9T, and PA6 was bound to (reacted with) the primary amino groups of the aminoethylated acrylic polymer (C).

On the other hand, Comparative Example 1 did not use the aminoethylated acrylic polymer (C), and therefore the resulting polyamide resin had a low melt viscosity and was poor in molding processability.

Comparative Example 2 used the epoxy-modified acrylic polymer (C'). As a result, the polyamide resin was more strongly reacted with (C') as compared to when the aminoethylated acrylic polymer (C) was used, and therefore had too high a melt viscosity and was poor in molding processability.

Comparative Example 3 used only PA9T, and therefore the polyamide resin had a high viscosity was poor in molding processability.

Comparative Example 4 used only PA6, and therefore the polyamide resin was poor in resistance to calcium chloride and the fuel barrier properties.

The above examples are specific embodiments of the present invention, but are merely illustrative and should not be construed as limiting the invention. It should be understood that various modifications obvious to those skilled in the art are within the scope of the present invention.

The fuel tube according to the present invention is used as a fuel tube for cars, but can be used also as a fuel tube for vehicles such as transport machinery other than cars (e.g., airplanes, industrial transport vehicles such as forklifts, excavators, and crane trucks, and railway cars).

What is claimed is:

1. A resin composition for fuel tubes comprising the following (A) to (C):
   (A) an aromatic polyamide resin;
   (B) an aliphatic polyamide resin; and
   (C) an aminoethylated acrylic polymer,
   wherein the resin composition contains a polyamide resin (D) obtained by an amine-exchange reaction between (A) and (B), and at least one selected from the group consisting of the polyamide resin (D), (A), and (B) is bound to (C).

2. The resin composition for fuel tubes according to claim 1, wherein (A) is polyamide 9T and (B) is polyamide 6.

3. The resin composition for fuel tubes according to claim 1, wherein the polyamide resin (D) obtained by an amine-exchange reaction between (A) and (B) and bound to (C) has a melt viscosity in the range of 200 to 4,000 Pa·s.

4. The resin composition for fuel tubes according to claim 1, whose (C) content is in the range of 0.1 to 5 parts by weight per 100 parts by weight of the total amount of (A) and (B).

5. The resin composition for fuel tubes according to claim 1, comprising an impact resistant agent.

6. A fuel tube comprising at least one resin layer, wherein the resin layer is composed of the resin composition for fuel tubes according to claim 1.

* * * * *